(12) United States Patent
Iyengar et al.

(10) Patent No.: US 12,417,409 B2
(45) Date of Patent: Sep. 16, 2025

(54) DETERMINING AND SELECTING PREDICTION MODELS OVER MULTIPLE POINTS IN TIME USING TEST DATA

(71) Applicant: International Business Machines Corporation, Armonk, NY (US)

(72) Inventors: Arun Kwangil Iyengar, Yorktown Heights, NY (US); Jeffrey Owen Kephart, Corlandt Manor, NY (US); Dhavalkumar C. Patel, White Plains, NY (US); Dung Tien Phan, Pleasantville, NY (US); Chandrasekhara K. Reddy, Kinnelon, NJ (US)

(73) Assignee: International Business Machines Corporation, Armonk, NY (US)

( * ) Notice: Subject to any disclaimer, the term of this patent is extended or adjusted under 35 U.S.C. 154(b) by 1188 days.

(21) Appl. No.: 16/924,934

(22) Filed: Jul. 9, 2020

(65) Prior Publication Data

US 2022/0012640 A1 Jan. 13, 2022

(51) Int. Cl.
*G06N 20/20* (2019.01)
*G06F 18/214* (2023.01)
*G06F 18/22* (2023.01)

(52) U.S. Cl.
CPC .......... *G06N 20/20* (2019.01); *G06F 18/214* (2023.01); *G06F 18/22* (2023.01)

(58) Field of Classification Search
CPC ........ G06N 20/00; G06N 20/10; G06N 20/20; G06F 18/214; G06F 18/22
See application file for complete search history.

(56) References Cited

U.S. PATENT DOCUMENTS

| 6,295,509 | B1 | 9/2001 | Driskell |
| 8,370,280 | B1 | 2/2013 | Lin et al. |
| 9,239,986 | B2 | 1/2016 | Lin et al. |
| 9,697,469 | B2 | 7/2017 | McMahon et al. |
| 2015/0100295 | A1* | 4/2015 | Jetcheva ............... G06F 30/367 703/18 |
| 2016/0350671 | A1 | 12/2016 | Morris, II et al. |
| 2017/0116525 | A1 | 4/2017 | Pinel et al. |

(Continued)

OTHER PUBLICATIONS

Schneider, B., Jäckle, D., Stoffel, F., Diehl, A., Fuchs, J. and Keim, D., 2017. Visual integration of data and model space in ensemble learning (pp. 15-22). IEEE. 2017 IEEE Visualization in Data Science (VDS).

(Continued)

*Primary Examiner* — Shane D Woolwine
(74) *Attorney, Agent, or Firm* — Patterson + Sheridan, LLP

(57) ABSTRACT

Techniques for model evaluation and selection are provided. A plurality of models trained to generate predictions at each of a plurality of intervals is received, and a plurality of model ensembles, each specifying one or more of the plurality of models for each of the plurality of intervals, is generated. A test data set is received, where the test data set includes values for at least a first interval of the plurality of intervals and does not include values for at least a second interval of the plurality of intervals. A first model ensemble, of the plurality of model ensembles, is selected based on processing the test data set using each of the plurality of model ensembles.

18 Claims, 12 Drawing Sheets

(56) References Cited

U.S. PATENT DOCUMENTS

| | | | |
|---|---|---|---|
| 2018/0046926 | A1 | 2/2018 | Achin et al. |
| 2019/0197395 | A1 | 6/2019 | Kibune et al. |
| 2019/0295000 | A1 | 9/2019 | Candel et al. |
| 2019/0332947 | A1 | 10/2019 | Fokoue-Nkoutche et al. |
| 2019/0332964 | A1 | 10/2019 | Fokoue-Nkoutche et al. |
| 2020/0074325 | A1 | 3/2020 | Lo et al. |
| 2020/0257992 | A1 | 8/2020 | Achin et al. |
| 2021/0019662 | A1 | 1/2021 | Wray et al. |
| 2021/0117869 | A1* | 4/2021 | Plumbley ............. G06F 18/217 |
| 2021/0279644 | A1 | 9/2021 | Givental et al. |
| 2021/0304151 | A1* | 9/2021 | Wadhwa ............ G06Q 10/1053 |
| 2021/0326721 | A1* | 10/2021 | Zhang ..................... G06N 5/04 |
| 2021/0342707 | A1 | 11/2021 | Xu et al. |
| 2022/0230096 | A1 | 7/2022 | Takamatsu et al. |

OTHER PUBLICATIONS

IBM, "List of IBM Patents or Patent Applications Treated As Related," for U.S. Appl. No. 16/924,934, filed Jul. 9, 2020.

Predicting Computing Prices Dynamically Using Machine Learning. An IP.com Prior Art Database Technical Disclosure Authors et. al.: Disclosed Anonymously. IP.com No. IPCOM000252018D. IP.com Electronic Publication Date: Dec. 13, 2017 (Year: 2017).

Superiority of Simplicity: A Lightweight Model for Network Device Workload Prediction Alexander Acker*†, Thorsten Wittkopp*†, Sasha Nedelkoski* , Jasmin Bogatinovski* , Odej Kao** Technische Universitat Berlin, Germany. arXiv:2007.03568v1 [cs.LG] Jul. 7, 2020 (Year: 2007).

M. Raihan-Al-Masud and H. A Mustafa, "Network Intrusion Detection System Using Voting Ensemble Machine Learning," 2019 IEEE International Conference on Telecommunications and Photonics (ICTP), Dhaka, Bangladesh, 2019, pp. 1-4, doi: 10.1109/ICTP48844.2019.9041736. (Year: 2019).

S. Eschrich and L. 0. Hall, "Learning from soft partitions of data: reducing the variance," The 12th IEEE International Conference on Fuzzy Systems, 2003. FUZZ '03., St. Louis, MO, USA, 2003, pp. 666-671 vol. 1, doi: 10.1109/FUZZ.2003.1209443. (Year: 2003).

A. Metzger et al., "Comparing and Combining Predictive Business Process Monitoring Techniques," in IEEE Transactions on Systems, Man, and Cybernetics: Systems, vol. 45, No. 2, pp. 276-290, Feb. 2015, doi: 10.1109/TSMC.2014.2347265. (Year: 2014).

X. Wenxin, "Heart Disease Prediction Model Based on Model Ensemble," 2020 3rd International Conference on Artificial Intelligence and Big Data (ICAIBD), Chengdu, China, 2020, pp. 195-199, doi: 10.1109/ICAIBD49809.2020.9137483. (Year: 2020).

P. Jamshidi, M. Velez, C. Kastner, N. Siegmund and P. Kawthekar, "Transfer Learning for Improving Model Predictions in Highly Configurable Software," 2017 IEEE/ACM 12th Intl Symposium on Software Eng for Adaptive and Self-Managing Sys, Buenos Aires, Argentina,2017,pp. 31-41, doi: 10.1109/SEAMS.2017.11 (Year: 2017).

* cited by examiner

| | 0.3 | 0.4 | 0.5 | 0.6 | 0.7 | 0.8 | 0.9 |
|---|---|---|---|---|---|---|---|
| ModelA | 0.15046 | 0.131195 | 0.114463 | 0.090292 | 0.078061 | 0.056548 | 0.054321 |
| ModelB | 0.152376 | 0.131912 | 0.110727 | 0.092947 | 0.076692 | 0.060849 | 0.041043 |
| ModelC | 0.134849 | 0.109137 | 0.107039 | 0.091798 | 0.079891 | 0.0629 | 0.037018 |
| ModelD | 0.144507 | 0.128428 | 0.098025 | 0.079082 | 0.082086 | 0.054854 | 0.036783 |
| ModelE | 0.141665 | 0.121948 | 0.104992 | 0.091135 | 0.076305 | 0.059003 | 0.03861 |
| ModelF | 0.146378 | 0.122837 | 0.108541 | 0.095307 | 0.082242 | 0.064742 | 0.036992 |
| ModelG | 0.158715 | 0.233214 | 0.102806 | 0.089059 | 0.095405 | 0.05986 | 0.040198 |
| ModelH | 0.141596 | 0.117886 | 0.099578 | 0.087185 | 0.072752 | 0.056313 | 0.038432 |
| ModelI | 0.152376 | 0.131912 | 0.110727 | 0.092947 | 0.076692 | 0.060849 | 0.041043 |
| ModelJ | 0.135724 | 0.114316 | 0.09365 | 0.079182 | 0.075736 | 0.054351 | 0.03611 |
| ModelK | 0.146378 | 0.122837 | 0.108541 | 0.095307 | 0.082242 | 0.064742 | 0.036992 |
| ModelL | 0.156332 | 0.138691 | 0.135791 | 0.113532 | 0.102815 | 0.08229 | 0.05986 |
| ModelM | 0.142572 | 0.125999 | 0.113469 | 0.087068 | 0.082536 | 0.053779 | 0.064486 |

Models Selected: 5

Cross Validation Error: 0.5794

FIG. 3A

| | 310A 0.3 | 310B 0.4 | 310C 0.5 | 310D 0.6 | 310E 0.7 | 310F 0.8 | 310G 0.9 |
|---|---|---|---|---|---|---|---|
| 305A ModelA | 0.15046 | 0.131195 | 0.114463 | 0.090292 | 0.078061 | 0.056548 | 0.054321 |
| 305B ModelB | 0.152376 | 0.131912 | 0.110727 | 0.092947 | 0.076692 | 0.060849 | 0.041043 |
| 305C ModelC | 0.134849 | 0.109137 | 0.107039 | 0.091798 | 0.079891 | 0.0629 | 0.037018 |
| 305D ModelD | 0.144507 | 0.128428 | 0.098025 | 0.079082 | 0.082086 | 0.054854 | 0.036783 |
| 305E ModelE | 0.141665 | 0.121948 | 0.104992 | 0.091135 | 0.076305 | 0.059003 | 0.03861 |
| 305F ModelF | 0.146378 | 0.122837 | 0.108541 | 0.095307 | 0.082242 | 0.064742 | 0.036992 |
| 305G ModelG | 0.158715 | 0.233214 | 0.102806 | 0.089059 | 0.095405 | 0.05986 | 0.040198 |
| 305H ModelH | 0.141596 | 0.117886 | 0.099578 | 0.087185 | 0.072752 | 0.056313 | 0.038432 |
| 305I ModelI | 0.152376 | 0.131912 | 0.110727 | 0.092947 | 0.076692 | 0.060849 | 0.041043 |
| 305J ModelJ | 0.135724 | 0.114316 | 0.09365 | 0.079182 | 0.075736 | 0.054351 | 0.03611 |
| 305K ModelK | 0.146378 | 0.122837 | 0.108541 | 0.095307 | 0.082242 | 0.064742 | 0.036992 |
| 305L ModelL | 0.156332 | 0.138691 | 0.135791 | 0.113532 | 0.102815 | 0.08229 | 0.05986 |
| 305M ModelM | 0.142572 | 0.125999 | 0.113469 | 0.087068 | 0.082536 | 0.053779 | 0.064486 |

315B Models Selected: 2
320B Cross Validation Error: 0.5829

FIG. 3B

DETERMINING AND SELECTING PREDICTION MODELS OVER MULTIPLE POINTS IN TIME USING TEST DATA

BACKGROUND

The present disclosure relates to machine learning, and more specifically, to model ensembles over multiple intervals of time.

Machine learning has been widely applied to generate predictions and estimations for future values and events. For example, a model may be trained to predict costs of a project, estimate a timeline for completion, and the like. Predicting the future values of a variable that evolves over time has significant applicability in any number of fields. Often, efforts are made to train a prediction model from a set of several recorded time-based data. For example, the model may be trained to evaluate data collected at various times of day, on various dates, and the like. Similarly, some models have been trained to operate on discrete intervals, such as stages of a project.

In existing approaches, model generation efforts are focused on minimizing the error of the predictions at any given stage or interval. For example, existing systems may simply utilize the most-accurate model at each interval, switching between models as needed. However, such an approach lacks nuance and can easily lead to over-fitting and other concerns. Often, these approaches fail to account for the realities of the underlying data or projects, resulting in inefficiencies and inaccurate estimates. Further, in typical systems today, models are trained using prior data, and are used without consideration of new data from ongoing projects as it evolves. Without consideration of this ongoing data, existing models can often fail to account for changing environments and realities.

SUMMARY

According to one embodiment of the present disclosure, a method is provided. The method includes receiving a plurality of models trained to generate predictions at each of a plurality of intervals; generating a plurality of model ensembles, each specifying one or more of the plurality of models for each of the plurality of intervals; receiving a test data set, wherein the test data set includes values for at least a first interval of the plurality of intervals and does not include values for at least a second interval of the plurality of intervals; and selecting a first model ensemble, of the plurality of model ensembles, based on processing the test data set using each of the plurality of model ensembles. One advantage of such an embodiment is that the system can dynamically score and select models based on incomplete test data, enabling rapid response to changing circumstances and improved model performance.

According to some embodiments of the present disclosure, any combination of the above embodiments can further include techniques where selecting the first model ensemble comprises, for each respective model ensemble of the plurality of model ensembles: generating a respective score for the respective model ensemble based on a respective prediction accuracy of the respective model ensemble. Advantageously, such an embodiment can yield improved models by scoring each model based on errors of the models at various intervals.

According to some embodiments of the present disclosure, any combination of the above embodiments can further include techniques where selecting the first model ensemble comprises, for each respective model ensemble of the plurality of model ensembles: generating a respective score for the respective model ensemble based on a respective variance between predictions generated by the respective model ensemble at adjacent intervals in the plurality of intervals. Advantageously, such an embodiment can yield improved models by scoring each model based on errors of the models at various intervals.

According to some embodiments of the present disclosure, any combination of the above embodiments can further include techniques where selecting the first model ensemble comprises, for each respective model ensemble of the plurality of model ensembles: generating a respective score for the respective model ensemble based on a tendency of the respective model ensemble to generate predictions that exceed the test data. Advantageously, such an embodiment can yield improved models by scoring each model based on how it tends to score, resulting in trends that are more suited for the particular implementation.

According to some embodiments of the present disclosure, any combination of the above embodiments can further include techniques where selecting the first model ensemble comprises, for each respective model ensemble of the plurality of model ensembles: generating a respective score for the respective model ensemble based on a tendency of the respective model ensemble to generate predictions that are lower than the test data. Advantageously, such an embodiment can yield improved models by scoring each model based on how it tends to score, resulting in trends that are more suited for the particular implementation.

According to some embodiments of the present disclosure, in any combination of the above embodiments the method can further include receiving a revised test data set, wherein the revised test data set includes values for the second interval and does not include values for at least a third interval of the plurality of intervals; and selecting a second model ensemble, of the plurality of model ensembles, based on processing the revised test data set using each of the plurality of model ensembles. Advantageously, such an embodiment can yield improved systems by providing dynamic evaluation and selection of models as needed, which improves accuracy in changing environments.

According to some embodiments of the present disclosure, any combination of the above embodiments can further include techniques where generating the plurality of model ensembles comprises, for each respective model ensemble of the plurality of model ensembles, for each respective interval of the plurality of intervals, selecting a respective model of the plurality of models for the respective interval based on (i) a respective prediction accuracy of the respective model at the respective interval, and (ii) at least one non-error metric for the respective model at the respective interval. One advantage of such an embodiment is that ensembles themselves are generated using non-error metrics, which can reduce overfitting and improve performance and accuracy of each ensemble.

According to a different embodiment of the present disclosure, any combination of the above-discussed embodiments can be implemented by one or more computer-readable storage media. The computer-readable storage media collectively contain computer program code that, when executed by operation of one or more computer processors, performs an operation. In embodiments, the operation performed can correspond to any combination of the above methods and embodiments.

According to yet another different embodiment of the present disclosure, any combination of the above-discussed embodiments can be implemented by a system. The system includes one or more computer processors, and one or more memories collectively containing a program which, when executed by the one or more computer processors, performs an operation. In embodiments, the operation performed can correspond to any combination of the above methods and embodiments.

BRIEF DESCRIPTION OF THE SEVERAL VIEWS OF THE DRAWINGS

FIG. 3A depicts model performance and techniques for ensemble generation to improve performance without unduly sacrificing accuracy, according to some embodiments disclosed herein.

FIG. 3B depicts model performance and techniques for ensemble generation to improve performance without unduly sacrificing accuracy, according to some embodiments disclosed herein.

DETAILED DESCRIPTION

Figure 1A:
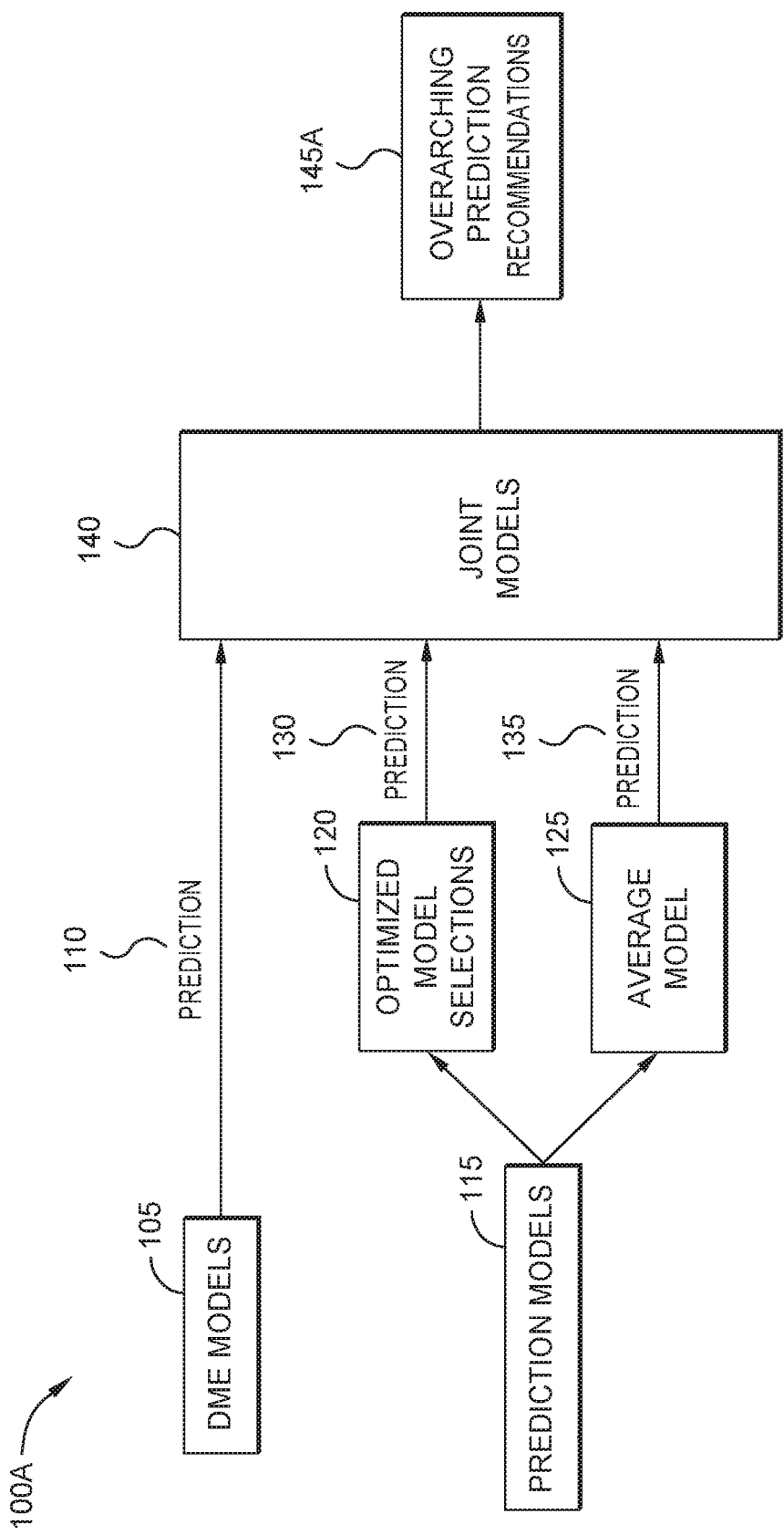
FIG. 1A depicts workflows for generating overarching prediction recommendations using optimized model ensembles, according to some embodiments disclosed herein.

Embodiments of the present disclosure provide improved techniques to evaluate and ensemble models for evaluating input data over a number of logical intervals. In embodiments, these intervals may include periods of time, as well as other logical stages or events (such as the current state or progress on a project). For example, one set of intervals may correspond to a sequence of days, where the relevant data for each interval is the data corresponding to the appropriate day. As another example, the intervals may correspond to progress on an ongoing project (such as the state of a manufacturing or software project), and the data for each interval corresponds to the data relevant to each stage (e.g., data related to the pre-planning stage, data related to the initial and intermediate phases, and so on).

In embodiments, rather than simply relying on error-based metrics to drive model selection, the system utilizes any number of non-error based metrics. These non-error metrics can include hard or soft constraints on the number of constituent models that should be utilized, as well as how the composition of the overarching model changes with time. That is, rather than simply selecting the most accurate model at each interval, the system can instead consider additional criteria such as attempting to minimize the number of model switches between adjacent intervals. Incorporating this non-error criteria can significantly improve the accuracy and operability of the system and ensemble. In some embodiments, these techniques can be especially valuable in situations where input data is relatively scarce, and there is a need to avoid overfitting. Similarly, in many real-world scenarios, parsimony in the number of constituent models is more consistent with the realities of the environment that is producing the data. Thus, consideration of non-error metrics can improve the overall accuracy of the predictions, even if the calculated error rates appear lower. Embodiments of the present disclosure provide techniques that balance such metrics, allowing consideration for a variety of tradeoffs among them to produce an overarching model that is best-suited for the problem.

In one embodiment, a number of prediction models are trained to generate predictions for input data, where the input data can correspond to any number of intervals. To generate an ensemble, the system can determine the prediction accuracy of each of at least two models using an error metric. Subsequently, for each relevant interval, the system can select at least one model to apply during the interval based on the error metrics, as well as one or more non-error metrics pertaining to factors other than prediction accuracy. By selecting one or more models for each interval, the system can build an overarching ensemble of models that can better-evaluate input data for ongoing systems or projects. As used herein, the intervals may include continuous data (e.g., streaming data in a continuous system) or discrete data (e.g., collected during discrete time steps). Non-error criteria generally includes constraints or parameters that restrict or affect model selection without any consideration of the actual accuracy or magnitude of the error of the models.

In some embodiments, one example of non-error criteria can include the total number of unique constituent prediction models included in the overarching model over the course of time. For example, the system may limit the number of different models used over the course of the entire project using hard or soft limits. A hard limit may include strictly limiting the number, while a soft constraint can include weighting or penalizing the ensemble if an excessive number of models are selected. As another example, the system may consider the number of changes in the selected constituent prediction models between successive time intervals. For example, suppose two ensembles both use the same two constituent models, where the first ensemble uses one model for the first N intervals and the second model for the second M intervals. This ensemble uses one model switch.

Suppose further the second model switches back and forth between the first and second model at every interval, resulting in many switches. In one embodiment, the system may therefore select the first ensemble, based on determining that it uses fewer model switches (although the same number of total models are utilized in both). In embodiments, the number of switches can similarly utilize hard or soft limits.

In some embodiments, the system can weight each model change or switch based on a variety of criteria, such as the progress level or interval when the switch occurs, and/or the type of switch. For example, model changes at early intervals may be weighted/penalized relatively lower than model switches nearer to the end of the project. Further, suppose a first model and a second model are the same type of model (e.g., a random forest model) using different parameters, while a third model is a different type (e.g., a linear regression model). In an embodiment, the system may weight/penalize a switch between the first and second models relatively lower than a switch to the third model.

In some embodiments, non-error criteria can include the number of sign changes in the prediction accuracy of the overarching model at successive time steps. As used herein, the number of sign changes refers to whether each model overestimates or underestimates the values in generating predictions. Notably, consideration of the sign (or sign change) of the error is a separate metric, and does not include consideration of the actual magnitude of the error. For example, a model that tends generate predictions that exceed the actual value (overestimating) may be associated with a positive sign, while models that tend to generate predictions less than the actual value (underestimating) are associated with negative signs. In an embodiment, the system endeavors to reduce the number of sign changes between intervals, such that the overarching ensemble tends to consistently overestimate or underestimate, rather than vacillating back and forth at each interval.

In at least one embodiment, the system can utilize non-error criteria related to the sign of the prediction error. For example, the system may generate an ensemble that uses models which bias towards overestimating or underestimating, depending on the needs of the particular project. As another example of non-error criteria which focuses on metrics other than the magnitude of the error, the system may consider the distribution of the errors, such as the median error, or various quantiles.

Embodiments described herein provide flexibility in setting the criteria so as to balance prediction accuracy with minimizing model changes across time levels. In at least one embodiment, the system defines and solves a constraint-optimization problem to generate the ensemble. For example, the system may create a set of at least to two predictive models and define a parametrized composition operator that describes how the overarching model is to be composed from the set of predictive models. The constraint optimization problem can then be defined based on the prediction accuracy of the model(s), as well as the parameters of the composition operator. By solving this constraint optimization problem, the system returns the parameters of the best composition operator, which defines the best overarching ensemble Techniques described in various embodiments of the present disclosure can produce models with significantly reduced overfitting, resulting in improved ensembles that perform more accurately for actual data sets. Further, embodiments described herein enable more stable predictions over time, improving the functionality of the models themselves.

FIG. 1A depicts a workflow 100A for generating overarching prediction recommendations using optimized model ensembles, according to some embodiments disclosed herein. In the illustrated embodiment, a set of Domain Expert (DME) Models 105 and Prediction Models 115 are provided. These models may be received pre-trained (e.g., built by other entities), and/or may be trained by the system using training data. Generally, the DME Models 105 comprise individuals with expertise in an area who can make predictions based on their knowledge. For example, if the domain is predicting stock prices, domain experts may make price predictions based on their knowledge of the companies and stock price behavior. As another example, if the domain is diagnosing medical conditions, a medical specialist could act as a domain expert and provide diagnoses. As illustrated by the Prediction 110, the DME Model(s) 105 can optionally be used to return one or more predictions for the relevant variable(s).

In an embodiment, each Prediction Model 115 is generally a machine learning model that has been trained to generate predictions or estimates based on input data. For example, at any stage of a project, the Prediction Models 115 may be trained to receive data related to the current stage and/or prior stages, and generate a predicted future value for one or more variables such as costs, timelines, complexity, and the like. In one embodiment, the one or more optimized ensembles of Prediction Models 115 include an ensemble of only selected models after optimization. Each Prediction Model 115 may be trained for one or more intervals in a set of relevant intervals/steps. That is, some Prediction Models 115 may be configured to generate predictions at all stages of the project, while others are configured only for a subset of the intervals. The Prediction Models 115 can generally include any number and variety of models, including supervised and unsupervised models. For example, the Prediction Models 115 may include (without limitation), random forest models, linear or logistic regression models, decision tress, support vector machines (SVM), naive Bayes classifiers, k-nearest neighbor models, K-means models, and the like.

In the illustrated embodiment, the workflow 100A includes Optimized Model Selections 120, where the system generates one or more optimized ensembles of Prediction Models 115. In an embodiment, the Optimized Model Selections 120 includes consideration of error metrics, as well as at least one non-error metric. As illustrated by Prediction 130, the Optimized Model Selection 120 can use the generated ensemble to return one or more predictions for the relevant variable(s). Further, in the illustrated workflow 100A, an Average Model 125 is used to return a Prediction 135. In one embodiment, the Average Model 125 is an aggregation of each Prediction Model 115 for the interval, rather than an optimized ensemble. In at least one embodiment, the Average Model 125 is an ensemble of all the models. In another embodiment, the Average Model 125 represents a single prediction value for the target variables, which is computed as a mean or average of the individual model predictions.

As illustrated, each Prediction 110, 130, and 135 are used to form Joint Models 140. In one embodiment, the Joint Models 140 correspond to a user interface (UI) that outputs the various Predictions 110, 130, and 135 for display to a user. The user may then utilize the interface to produce and output one or more Overarching Prediction Recommendations 145A. These can include estimates or predictions for each relevant variable, as well as recommendations for how to proceed from the current stage.

Figure 1B:
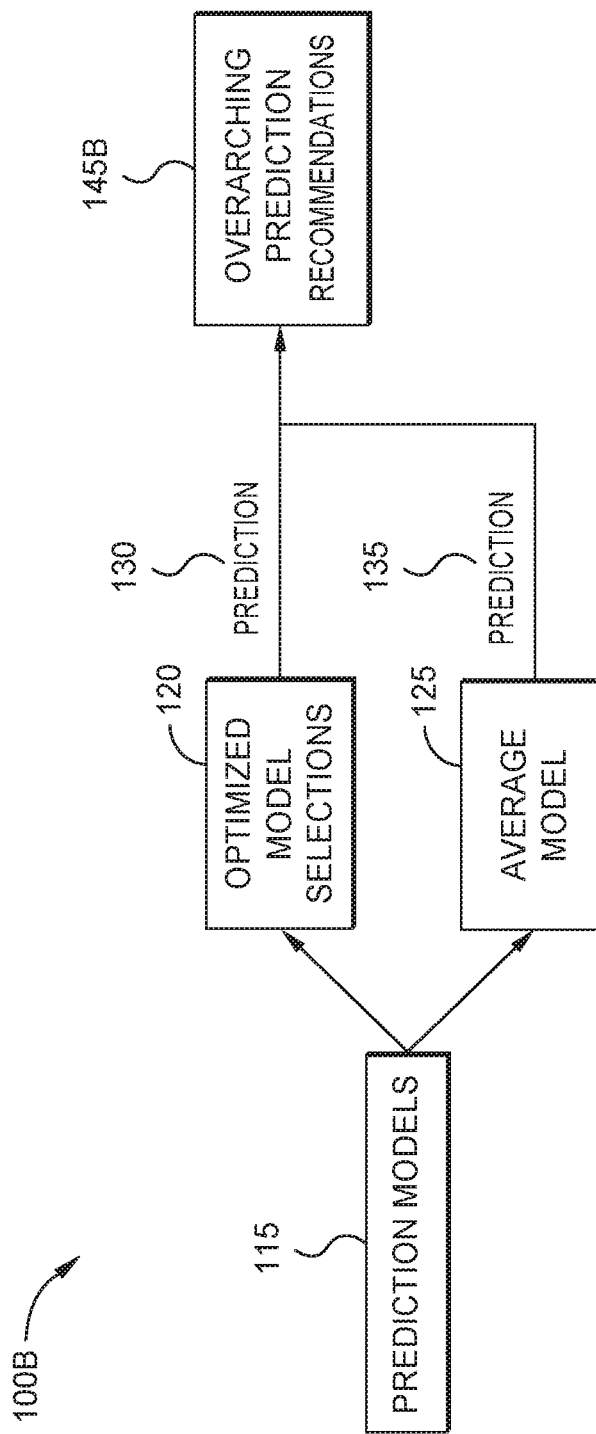
FIG. 1B depicts workflows for generating overarching prediction recommendations using optimized model ensembles, according to some embodiments disclosed herein.

FIG. 1B depicts a workflow 100B for generating overarching prediction recommendations using optimized model ensembles, according to some embodiments disclosed herein. The workflow 100B is a reduced version of the workflow 100A. Specifically, the workflow 100B also uses the Prediction Models 115 to generate Optimized Model Selections 120 and an Average Model 125. The resulting Predictions 130 and 135 are then used directly to generate Overarching Prediction Recommendations 145B. Such a streamlined environment may be beneficial in some implementations. In at least one embodiment, the system utilizes only the Optimized Model Selections 120 (e.g., the optimized model ensemble) to generate output predictions, without consideration for other models (e.g., without use of an Average Model 125).

Figure 2:
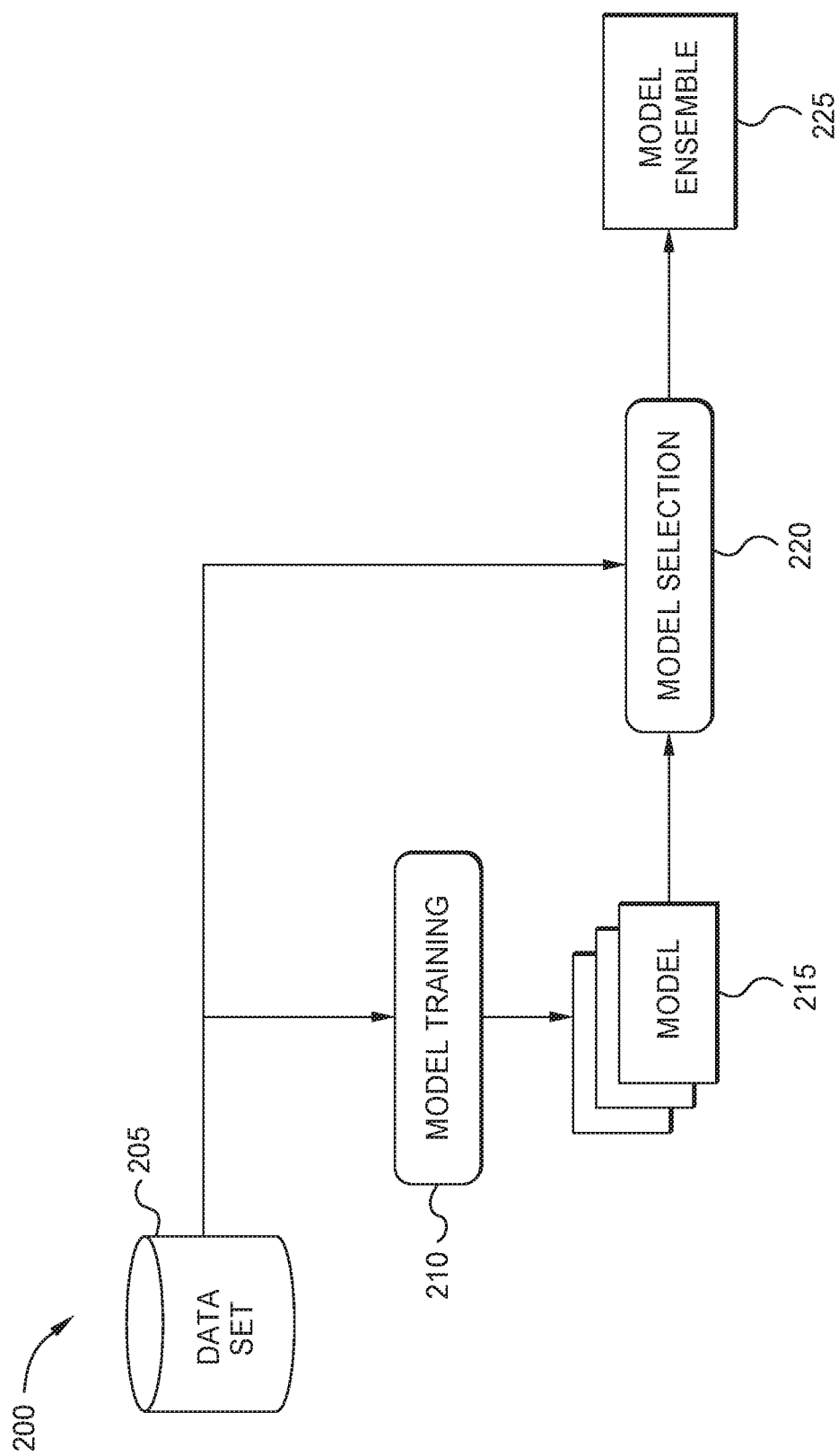
FIG. 2 illustrates a workflow for generating model ensembles across a number of multiple intervals, according to some embodiments disclosed herein.

FIG. 2 illustrates a workflow 200 for generating model ensembles across a number of multiple intervals, according to some embodiments disclosed herein. The workflow 200 generally utilizes historical data at a number of intervals to build individual predictive models, and select the best one or more models at each interval to output an ensemble. In the illustrated embodiment, an input Data Set 205 is received. The Data Set 205 generally includes data (such as values for a number of variables) at various stages or intervals in one or more completed projects. At Model Training 210, all or a portion of the Data Set 205 is used to generate a set of predictive Models 215. Each Model 215 is trained to receive input data (e.g., data available at a current stage or interval), and generate predictions about the value(s) of one or more variables in one or more future intervals.

For example, suppose the Data Set 205 includes data for intervals A, B, and C. The Model Training 210 may include training a Model 215 by using the data in interval A as input with the data from Interval B and/or C as target output. This trains the Model 215 to generate predictions for other projects in interval A. The Model 215 (or a separate model) may also be trained to generate predictions at interval B, such as by providing the data from interval B and/or interval A as input, and using the data from interval C as target output. In this way, each Model 215 can be trained to generate predictions for one or more future intervals. In one embodiment, the Models 210 are trained only using data for completed projects. That is, in such an embodiment, the Models 210 are not trained based on data for ongoing (uncompleted) projects.

In the illustrated workflow 200, once the Models 215 are trained, they are provided to a component for Model Selection 220. The Model Selection 220 generally includes selecting, for each relevant interval, one or more Models 215 to be used in the Model Ensemble 225. To do so, in embodiments, the Model Selection 220 can consider the accuracy/error of each Model 215 at each interval. As illustrated, the Model Selection 220 can do so using all or a portion of the Data Set 205. In one embodiment, a subset of the Data Set 205 is used in Model Training 210, while a second subset is held for testing/evaluation of the Models 215.

In embodiments, once the error of each Model 215 at each interval is determined, the Model Selection 220 further utilizes one or more non-error metrics, as discussed above. These metrics can include the total number of Models 215 that are used, the number and/or type of model switches between adjacent intervals, the tendency of each Model 215 to overestimate or underestimate the actual value, the number of sign changes between adjacent model predictions, and the like. By balancing such non-error metrics with the error-based metrics, the system can generate an overarching Model Ensemble 225 that reduces overfitting and improves performance, without undue reduction in accuracy of the model. For example, the accuracy (or error rate) of each respective model can be evaluated by processing withheld test data using the model, and comparing the generated predictions with the actual label associated with the test data.

FIGS. 3A and 3B depict model performance and techniques for ensemble generation to improve performance without unduly sacrificing accuracy, according to some embodiments disclosed herein. FIGS. 3A and 3B include a graphs 300A and 300B, respectively, illustrating the error rate of each model at each interval. In the illustrated graphs 300A and 300B, the set of input models (e.g., the Prediction Models 115 or the Models 215) are each associated with a respective row 305A-M. As illustrated, the input models can include any number and variety of models. These can include models with differing architectures, hyperparameters, inputs, outputs, and the like. As illustrated, each column 310A-G in the graph 300A and 300B corresponds to an interval in the project(s).

For example, the column 310A includes data relevant for interval "0.3," while the column 310E includes data for the interval "0.7". Although decimal values are utilized in the illustrated embodiment to define the intervals, in embodiments, any suitable label or delineation may be utilized. As illustrated, each cell in the graphs 300A and 300B (e.g., each intersection of a row 305 and column 310) specifies the error rate of the corresponding model at the corresponding interval. For example, as depicted in the intersection of row 305B and column 310A, the error rate of the "ModelB" model at interval "0.3" is 0.152376. In the same interval, as illustrated in row 305K, the "ModelK" model has an error of 0.146378.

In embodiments, the error rate of a given model in a given interval can be determined in any number of ways. In one embodiment, for each individual prediction model, the system fits the error values from all test sample errors (e.g., all projects reflected in the Data Set 205) with a Gaussian Process Regression (GPR) where the independent variable is the time point/interval, and the dependent variable is algebraic error on the test set. For each prediction model i at each interval j, three quantities can then be calculated using the fitted GPR: the predicted values $a(i,j)$, the lower bound $a_l(i,j)$ and upper bound $a_u(i,j)$ for the 90% confidence interval. In one such embodiment, the aggregated prediction error for prediction model i at interval j can be computed using $|a(i,j)|+\gamma|a_l(i,j)|+\gamma|a_u(i,j)|$ for some $0 \leq \gamma \leq 1$.

In another embodiment, the system determines the error using for each individual prediction model by creating a boxplot for the error values for test sample errors at each time interval. Then, for each prediction model i at each time point j, three quantities can be calculated using the boxplot: the median $a(i,j)$, the first quartile $a_l(i,j)$ and third quartile $a_u(i,j)$ for the 90% confidence interval. The aggregated prediction error for the prediction model i at each time point j can then be calculated using $|a(i,j)|+\gamma|a_l(i,j)|+\gamma|a_u(i,j)|$ for some $0 \leq \gamma \leq 1$.

In FIG. 3A, the model with the lowest error rate is highlighted for each time interval. Specifically, in the intervals corresponding to column 310A and 310B, the model corresponding to row 305C had the lowest error. For intervals 310C and 310G, the model 305J had the lowest error. For interval 310D, the model 305D has the lowest error. For interval 310E, the model 305H has the lowest error. Finally, for interval 310F, the model 305M has the lowest error. As illustrated by bock 315A, therefore, simply selecting the best-performing model at each interval results in a total of five models being selected for the ensemble. As depicted in block 320A, the cross validation error for this ensemble is 0.5794. In some embodiments, the overall error for an ensemble of models is determined by computing an average of errors for each model included in the ensemble.

In the illustrated embodiment of FIG. 3B, the system has optimized the model ensemble using one or more non-error criteria. Specifically, as depicted by block 315B in the illustrated embodiment, the system has limited the total number of models in the ensemble to two. As illustrated, this has resulted in a less-accurate model being selected for intervals 310D, 310E, and 310F. Specifically, in interval 310D, although the model 305D has lower error, the model 305K has been selected. Similarly, in interval 310E, the model 305K was selected rather than the model 305H, although the model 305H had lower error. Further, in interval 310F, the model 305K was selected rather than the model 305M. As illustrated, the resulting cross-validation error for this ensemble (using only models 305C and 305K) is 0.5829. Thus, the system can significantly reduce the total number of models used (from five to two), with only a minimal increase in cross-validation error (from 0.5794 to 0.5829).

Notably, in some embodiments, although the computed error for the ensemble may be higher, the actual error may in fact be lower in production. For example, using five models rather than two can result in overfitting, where the ensemble is highly accurate for the training data but fails to account for the realities and nuances of the real world. Thus, by reducing the number of models, the generated ensemble may in fact return improved accuracy. Other non-error criteria can similarly be used, including the number and type of model switches, the timing of each switch, the sign changes, and the like.

Figure 4A:
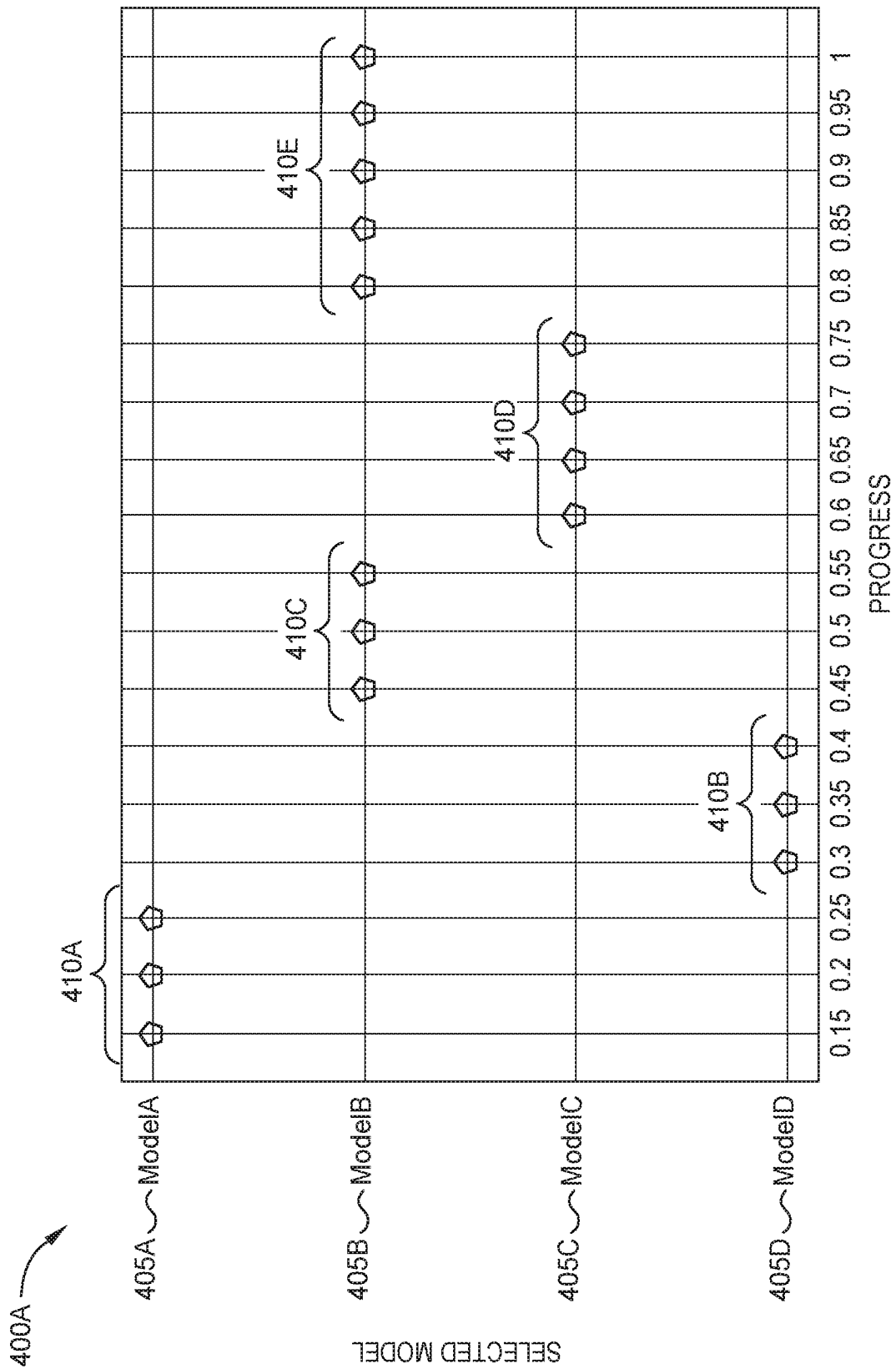
FIG. 4A depicts model ensembles generated using techniques described herein and constructed to evaluate input data across multiple intervals, according to some embodiments disclosed herein.
Figure 4B:
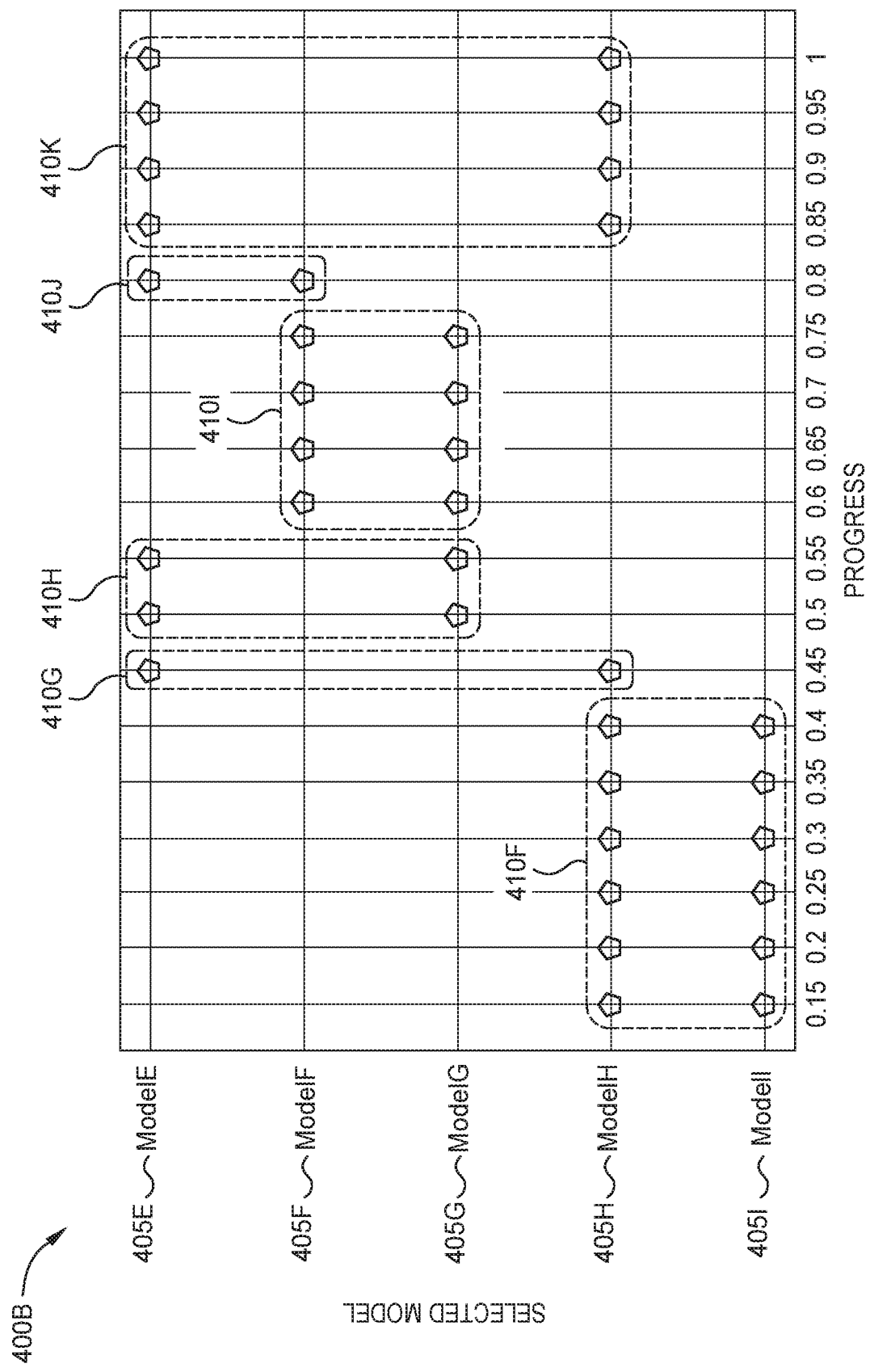
FIG. 4B depicts model ensembles generated using techniques described herein and constructed to evaluate input data across multiple intervals, according to some embodiments disclosed herein.

FIGS. 4A and 4B depict model ensembles generated using techniques described herein and constructed to evaluate input data across multiple intervals, according to some embodiments disclosed herein. Specifically, FIG. 4A depicts an Ensemble 400A where a single Model 405A-D is selected for each time interval, while FIG. 4B depicts an Ensemble 500B where exactly two Models 405E-I are selected for each interval. As depicted in FIG. 4A, for intervals 0.15, 0.2, and 0.25 the Ensemble 400A utilizes predictions generated by the Model 405A labeled "ModelA." This is depicted by the points 410A. Subsequently, when the project reaches interval 0.3, the Ensemble 400A utilizes predictions generated by the Model 405D, labeled "ModelD." As illustrated by points 410B, this model is used for intervals 0.3 through 0.4.

Further, at intervals 0.45 through 0.55, the Ensemble 400A utilizes predictions generated by Model 405B (labeled "ModelB"), as illustrated by points 410C. For intervals 0.6 through 0.75, the Ensemble 400A utilizes predictions generated by Model 405C (labeled "ModelC"), as depicted by points 410D. Finally, for intervals 0.8 through 1, the Ensemble 400A utilizes predictions generated by Model 405B (labeled "ModelB"), indicated by points 410E.

In one embodiment, during runtime, the Ensemble 400A is thus used to return predictions by evaluating the input data using one of the four constituent Models 405A-D based on the current interval/time. For example, suppose the intervals relate to the percentage of completion for a project. When the project is twenty percent complete (the 0.2 interval), the Ensemble 400A uses the Model 405A. By switching between Models 405 at appropriate intervals, the Ensemble 400A can return improved accuracy. Further, if the Ensemble 400A was created with consideration of one or more non-error metrics (such as reducing the number of switches or models), the Ensemble 400A can operate more effectively, as compared to an ensemble that simply selects the lowest-error model at each interval.

FIG. 4B depicts an Ensemble 400B that utilizes exactly two Models 405E-I at each interval. In some embodiments, the number of models to be used at each interval is a predefined or user defined value. For example, the system may select exactly n Models 405 at each interval, where n is specified by a user. In some embodiments, the system may be configured to select up to n models (e.g., n or fewer) for each interval. Along with the number of models per time step, in some embodiments, the other non-error criteria may be predefined and/or specified by a user. For example, the user may define the total number of models to use, the number of switches, the weight of each switch (e.g., based on time and/or type of switch), the sign preference (e.g., biased towards over or underestimating), the number of sign changes, and the like. By tuning these parameters, various ensembles can be created that may perform differently on the same set of input data.

As depicted in FIG. 4B, for intervals 0.15 through 0.4, the Ensemble 400B utilizes predictions generated by Models 405H and 405I. This is depicted by the points 410F. Subsequently, when the project reaches interval 0.45, the Ensemble 400B utilizes predictions generated by the Models 405E and 405G. As illustrated by points 410G, these models are used only for the interval corresponding to a progress of 0.45.

Further, as depicted by the points 410H, when the current stage of progress corresponds to intervals from 0.5 through 0.55, the Ensemble 400B utilizes predictions generated by Models 405E and 405G. Next, as depicted by the points 410I, when the current stage of progress corresponds to intervals from 0.6 through 0.75, the Ensemble 400B utilizes predictions generated by Models 405F and 405G. Additionally, as depicted by the points 410J, when the current stage of progress corresponds to interval 0.8, the Ensemble 400B utilizes predictions generated by Models 405E and 405F. Finally, as depicted by the points 410K, when the current stage of progress corresponds to intervals from 0.85 through 1, the Ensemble 400B utilizes predictions generated by Models 405E and 405H.

In one embodiment, when utilizing more than one model at a given time interval, the Ensemble 400B returns an aggregate prediction based on the outputs of each constituent model at the interval. For example, at interval 0.45, the Ensemble 400B may average the predictions generated by Model 405E and 405H, and return this average value as the prediction/estimate for the interval. In this way, the system can utilize any number of models at each time interval.

Figure 5:
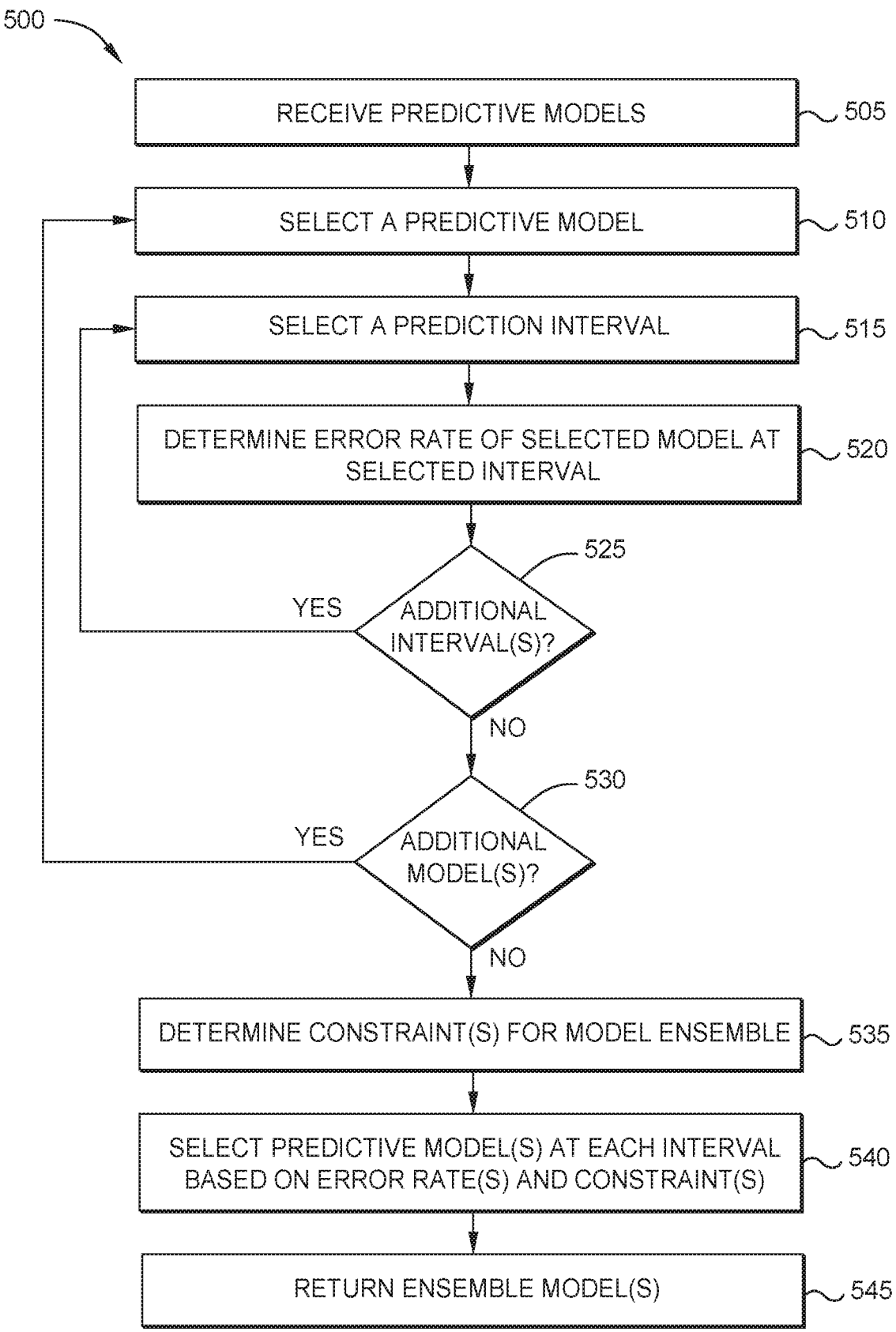
FIG. 5 is a flow diagram depicting a method for generating model ensembles with consideration for a variety of non-error metrics, according to some embodiments disclosed herein.

FIG. 5 is a flow diagram depicting a method 500 for generating model ensembles with consideration for a variety of non-error metrics, according to some embodiments disclosed herein. The method 500 begins at block 505, where an ensemble system receives one or more predictive models. In embodiments, this may include receiving pre-trained models constructed by other entities or components, as well as receiving training data and training one or more predictive models. At block 510, the ensemble system selects one of the trained models. The method 500 then proceeds to block 515, where the ensemble system selects one of the relevant prediction intervals for which the ensemble is being created. Generally, the intervals may be defined based on any logical segmentation of a project, such as time-based segmentation, progress-based delineation, and the like. Further, the intervals may be continuous or discrete. Additionally, data may be collected throughout each interval (e.g., a stream of data for the interval) or at discrete points in the interval (e.g., once at the beginning and/or once at the end).

In embodiments, the intervals may be predefined and/or specified by a user. For example, some projects may have predefined stages or intervals (e.g., daily updates, or intervals corresponding to each stage of progress in the project). The method 500 then continues to block 520, where the ensemble system determines the error rate of the selected model at the selected interval. At block 525, the ensemble system determines whether there is at least one additional interval for which the selected model has been trained/configured to generate predictions. If so, the method 500 returns to block 515 to select the next relevant interval. If not, the method 500 continues to block 530, where the ensemble system determines whether there is at least one additional model that was received/trained but not yet evaluated.

If there is at least one predictive model remaining to be evaluated, the method 500 returns to block 510 to select the next model. If not, the method 500 continues to block 535, where the ensemble system determines the non-error constraints for the desired ensemble. In embodiments, as discussed above, the constraints relate to restrictions on the final ensemble that are based on factors other than the magnitude of the error of each model. Such factors include the total number of models to be used, the total number of model switches, and the like. In various embodiments, these constraints may be predefined and/or specified by a user or other entity requesting creation of the ensemble. In some embodiments, the ensemble system can generate multiple ensembles using differing constraints, and evaluate how each performs on newly-received data (e.g., for ongoing projects and/or newly-completed projects) to identify constraints which produce improved ensembles for the relevant field/projects.

At block 540, the ensemble system then solves this constraint-optimization problem to select one or more predictive model(s) at each interval, based on the determined error rates of each model (determined at block 520) as well as the non-error constraints or metrics (determined in block 535). Finally, the method 500 continues to block 545, where the ensemble system returns the generated ensemble(s).

As discussed above, in some embodiments, the ensemble system generates ensembles using a constraint-optimization approach that weights and/or penalizes various criteria based on the constraints. For example, each model switch may be associated with a weight/penalty. In some embodiments, each switch is associated with a penalty of zero until a predefined maximum number of switches have occurred, at which point each switch is penalized at a non-zero weight (which may be specified by the user). Similarly, the penalty of each switch may be based in part on the stage at which the switch occurs (e.g., with earlier switches being penalized less), and/or based on the type of switch (e.g., where switches between models with different architectures are penalized more highly than models with similar architectures).

In embodiments, other non-error metrics may be associated with similar weights and penalties. For example, each sign change between adjacent intervals may be associated with a penalty (which may similarly be based in part on the stage of the change), the number of total constituent models may be related to a weight or penalty, and the like. In an embodiment, selecting the best model(s) at each interval is performed based on these penalties. For example, for any given combination of models, the ensemble system may compute the overall penalty/weight of the combination based on the non-error metrics, and generate a score for the ensemble based on these weights. The ensemble system may then select the ensemble with a lower penalty score, even if it also has a lower accuracy. In embodiments, the particular balance between penalties and accuracy can be determined based on predefined criteria and constraints.

Figure 6:
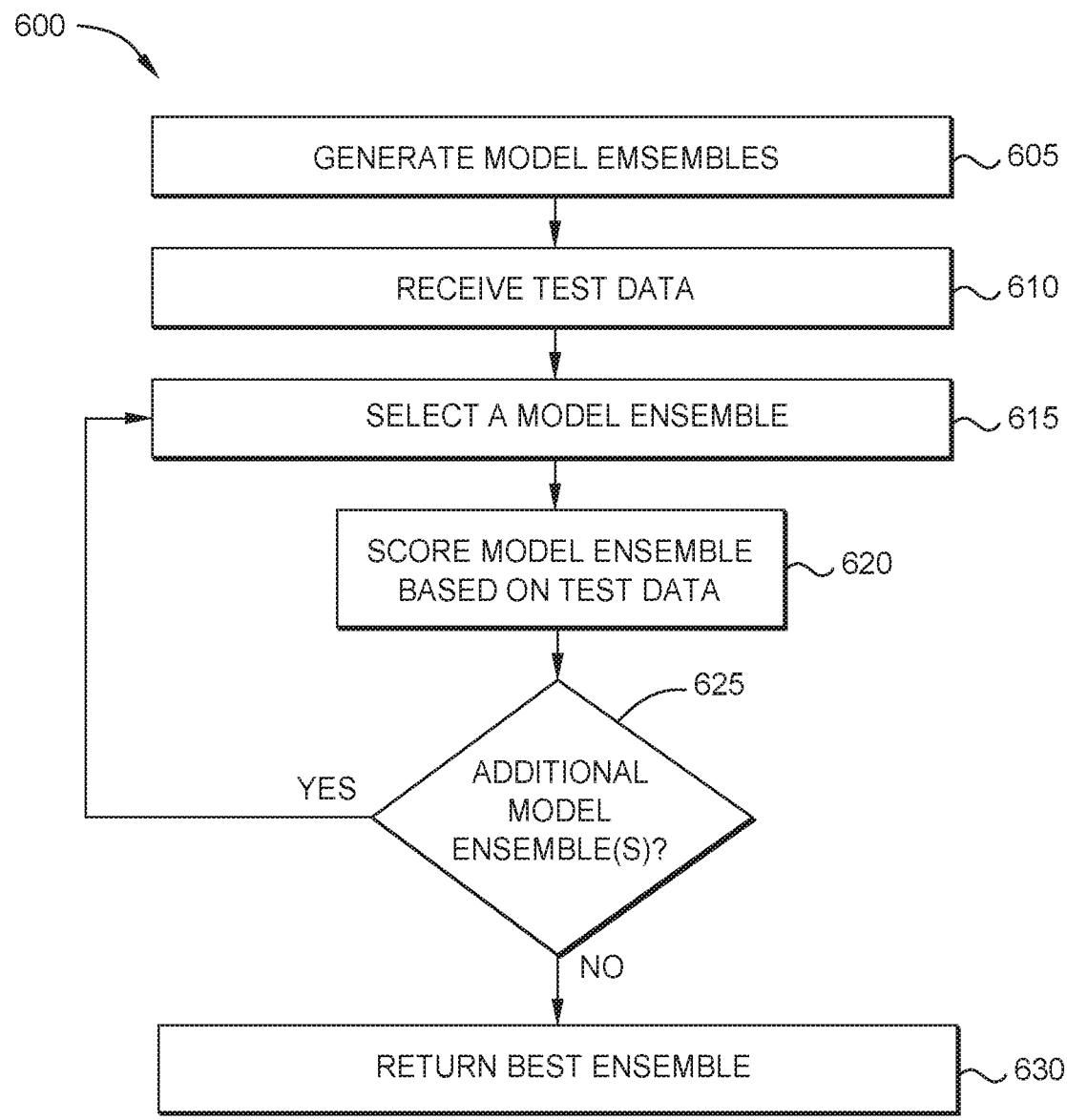
FIG. 6 is a flow diagram depicting a method for evaluating ensembles and prediction model performance in view of ongoing test data in order to improve performance, according to some embodiments disclosed herein.

FIG. 6 is a flow diagram depicting a method 600 for evaluating ensembles and prediction model performance in view of ongoing test data in order to improve performance, according to some embodiments disclosed herein. In embodiments, models are constructed using training data. In some embodiments of the present disclosure, multiple models are created at different points in time. This means that as new models are produced over a period of time, may become possible to use some test data to refine the models. For example, suppose that the goal is to predict a target value t. The final value for t may not be known until some point in the future. As time progresses, however, the system can make new predictions of t, which may be denoted pred1(t), pred2(t), pred3(t), and so on. In some embodiments, later predictions of t tend to be more accurate, as more data is available to make the prediction.

Some embodiments described herein are used to generate predictions for projects. For example, the system may help to predict the completion time and/or cost to complete a major project, such as writing a significant software system (e.g., writing an operating system, database management system, and the like), developing a new car, airplane, producing a new drug, and the like. In some embodiments, the system utilizes a set of past (completed) projects to develop models in order to make predictions on the final cost(s) for one or more ongoing projects. In one embodiment, the system makes predictions at several points in time as each ongoing project progresses, and later predictions are often more accurate than earlier predictions. Throughout the process, in some embodiments, the system uses the set of past projects in order to develop the current models. In some embodiments, the system additionally uses data from ongoing projects (which is referred to as test data) to refine the predictions. Note that the system does not yet have all data from ongoing projects, as they are not completed yet.

In an embodiment, if multiple ensembles or models are available, it may be uncertain which model or ensemble is best-suited for the ongoing project, as only a subset of the intervals have been completed. In some embodiments, an ensemble system endeavors to select or generate an overarching model with certain characteristics, such that the predictions generated for the ongoing projects do not fluctuate too significantly (e.g., above a threshold) between different intervals, and/or that the predictions should converge on an accurate estimation of the final value as early as possible (e.g., at as early an interval as possible).

The method 600 begins at block 605, where the ensemble system generates a set of one or more model ensembles. For example, in one embodiment, the ensemble system does so using the method 500 discussed above, and a variety of differing constraints/weights. At block 610, the ensemble system receives test data. In an embodiment, the test data corresponds to an ongoing project that has begun but not yet completed. Thus, the test data includes values for one or more intervals (e.g., at the beginning of the project) but lacks values for one or more other intervals (e.g., future progress levels which have not yet been reached).

At block 620, the ensemble system scores the selected model or ensemble based on the received test data for the ongoing project. In embodiments, this score may be based on a wide variety of factors. For example, in one embodiment, the ensemble system scores the model(s) based on the sum of differences and/or squares of differences between the current best prediction for an ongoing project made by the selected model (e.g., using data at the current interval), and the predictions made at different prior intervals (e.g., any prior intervals). In some embodiments, these differences may be assigned weights based on the progress level (e.g., such that the differences between a prediction at an early interval and a subsequent interval are weighted lower than differences between a later interval and the subsequent interval).

As another example, in some embodiments, the ensemble system scores the model(s) based on the sum of differences and/or squares of differences between the predictions made by the selected model across adjacent intervals. That is, the ensemble system may generate a score based on how the predictions change between successive intervals (e.g., between the current interval and the immediately-prior interval). In some embodiments, these differences may similarly be assigned weights based on the progress level (e.g., such that differences between early adjacent intervals are weighted lower than differences between subsequent adjacent intervals).

In some embodiments, it is desirable for predictions for an ongoing project to not fluctuate by a significant amount. In such an embodiment, models which fluctuate less in their predictions (at each interval) can be given preference and assigned lower error scores. In various embodiments, methods to quantify fluctuation in predictions can include variance and/or standard deviation. Of course, in embodiments, other suitable methods can be applied.

In some embodiments, the ensemble system generates the error score based on a preference for the predictions to either remain stable, or trend in one direction over time, as determined based on predefined or user-provided criteria. For example, the user may prefer an ensemble that is relatively stable, or that trends closer each step (e.g., from significant overestimation and trending towards an accurate prediction). In such an embodiment, if the trend moves the other way (e.g., increasing), the ensemble system may generate a higher score. Similarly, in some embodiments, if the trend changes significantly over time, the resulting error score may be higher.

In some embodiments, it is undesirable to fluctuate between making a prediction for an ongoing project which increases over time followed by a subsequent prediction for the ongoing project which decreases over time (or vice versa). In such embodiments, it may be appropriate to assign higher error scores to models which fluctuate between increasing and decreasing predictions for an ongoing project over time.

In at least one embodiment, depending on the particular domain and implementation, a predicted value that is too high or too low may be preferred. For example, it may be preferable to overestimate costs (resulting in a surplus of resources), rather than underestimate them (resulting in a shortage). In such an embodiment, the ensemble system may score the selected model based in part on whether it tends to overestimate or underestimate the actual value (or the current-best value, such as the value generated at the current interval), as appropriate.

In some embodiments, the ensemble system can generate such error scores across multiple ongoing projects, and the error scores may be aggregated and weighted based on the importance of each project. This allows the ensemble system to evaluate and score each ensemble based on multiple projects with separate and distinct test data.

Once the selected model has been scored based on the test data, which may include scoring not only the current predictions but also the prior predictions (e.g., predictions generated using data from one or more prior intervals), the method 600 proceeds to block 625, where the ensemble system determines whether there is at least one additional model ensemble that has not yet been scored based on the test data. If so, the method 600 returns to block 615. Otherwise, the method 600 continues to block 630, where the ensemble system returns the best ensemble, as determined by the generated scores. In this way, the ensemble system can dynamically switch between ensembles (which each can include any number of constituent models) in order to ensure the generated predictions are sufficiently accurate and otherwise align with the user's preferences.

Figure 7:
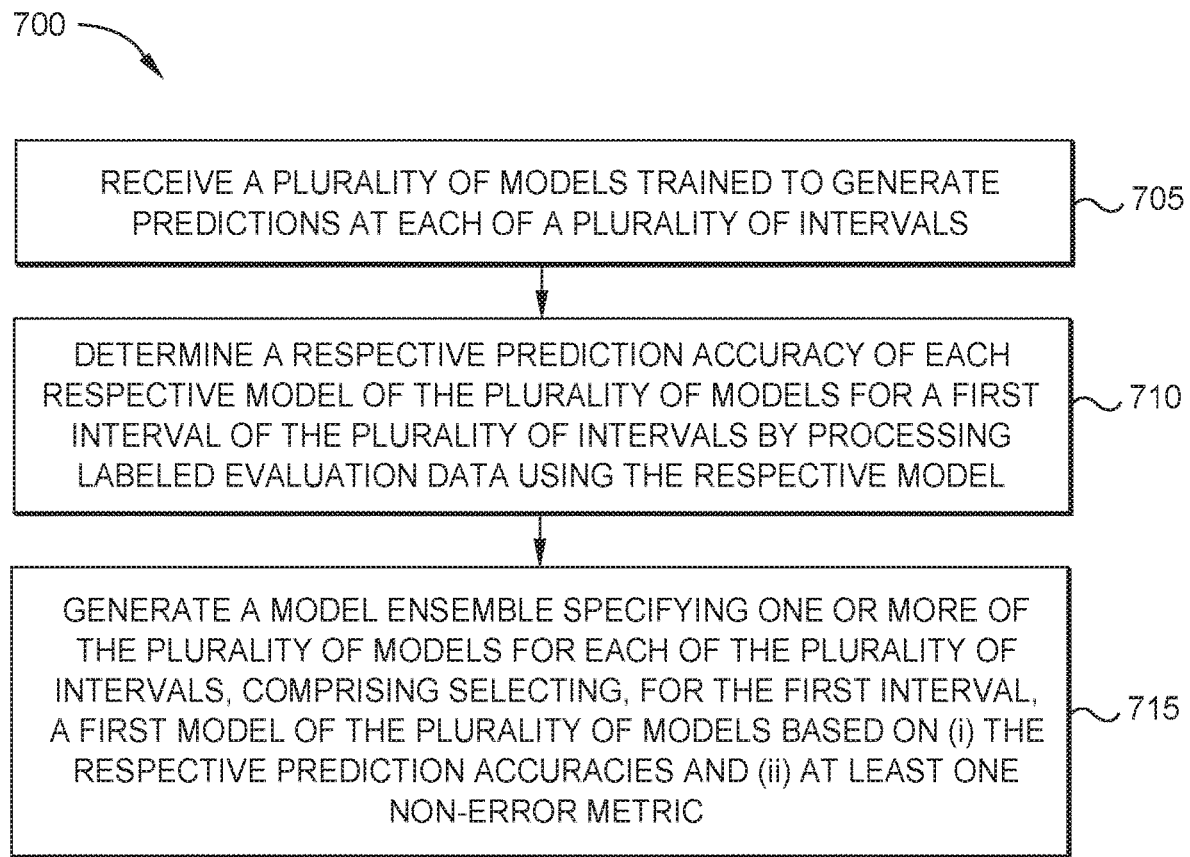
FIG. 7 is a flow diagram depicting a method for generating model ensembles to improve performance over multiple intervals, according to some embodiments disclosed herein.

FIG. 7 is a flow diagram depicting a method 700 for generating model ensembles to improve performance over multiple intervals, according to some embodiments disclosed herein. The method 700 begins at block 705, where an ensemble system receives a plurality of models trained to generate predictions at each of a plurality of intervals. At block 710, the ensemble system determines a respective prediction accuracy of each respective model of the plurality of models for a first interval of the plurality of intervals by processing labeled evaluation data using the respective model. Further, at block 715, the ensemble system generates a model ensemble specifying one or more of the plurality of models for each of the plurality of intervals, comprising selecting, for the first interval, a first model of the plurality of models based on (i) the respective prediction accuracies and (ii) at least one non-error metric.

Figure 8:
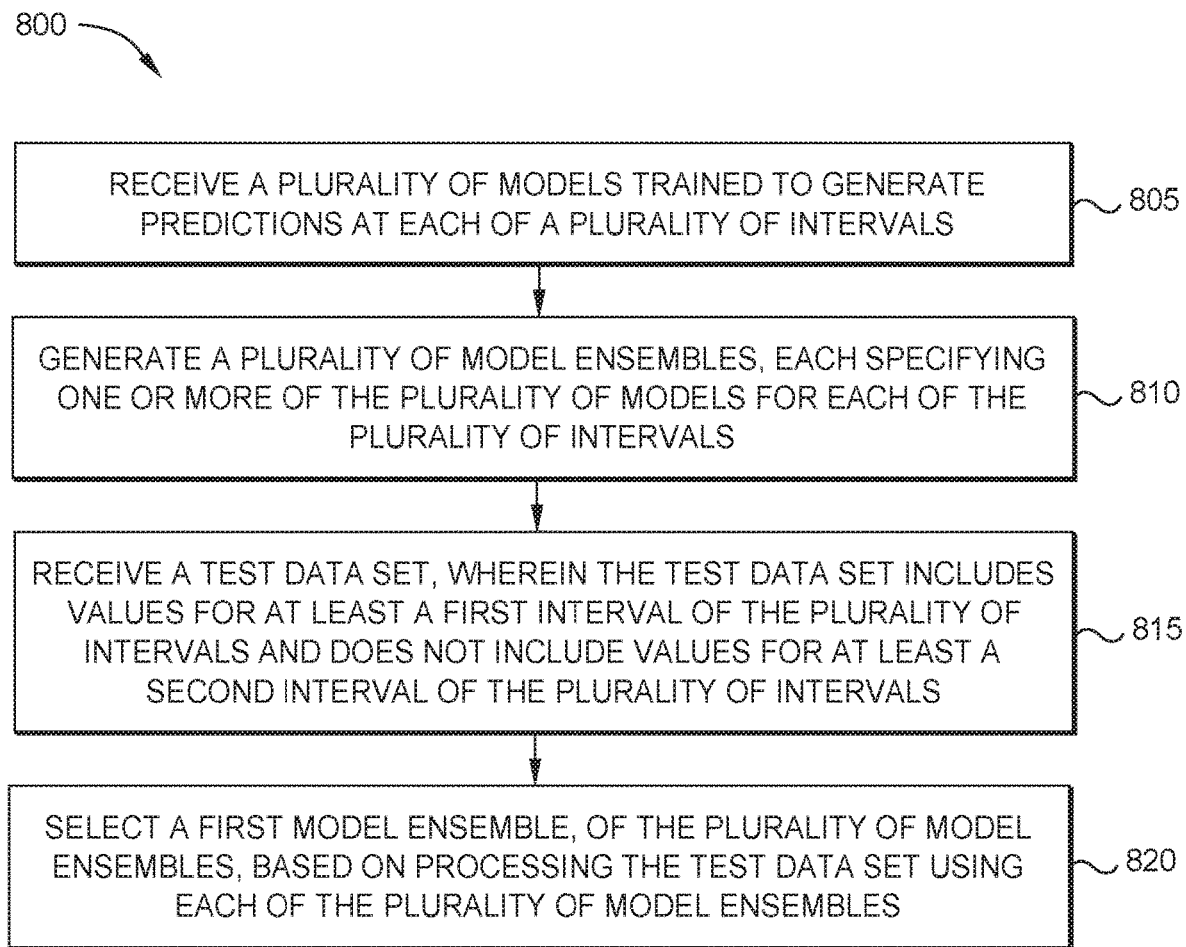
FIG. 8 is a flow diagram depicting a method for evaluating and selecting models in view of received test data, according to some embodiments disclosed herein.

FIG. 8 is a flow diagram depicting a method 800 for evaluating and selecting models in view of received test data, according to some embodiments disclosed herein. The method 800 begins at block 805, where an ensemble system receives a plurality of models trained to generate predictions at each of a plurality of intervals. At block 810, the ensemble system generates a plurality of model ensembles, each specifying one or more of the plurality of models for each of the plurality of intervals. The method 800 then continues to block 815, where the ensemble system receives a test data set, wherein the test data set includes values for at least a first interval of the plurality of intervals and does not include values for at least a second interval of the plurality of intervals. Further, at block 820, the ensemble system selects a first model ensemble, of the plurality of model ensembles, based on processing the test data set using each of the plurality of model ensembles.

Figure 9:
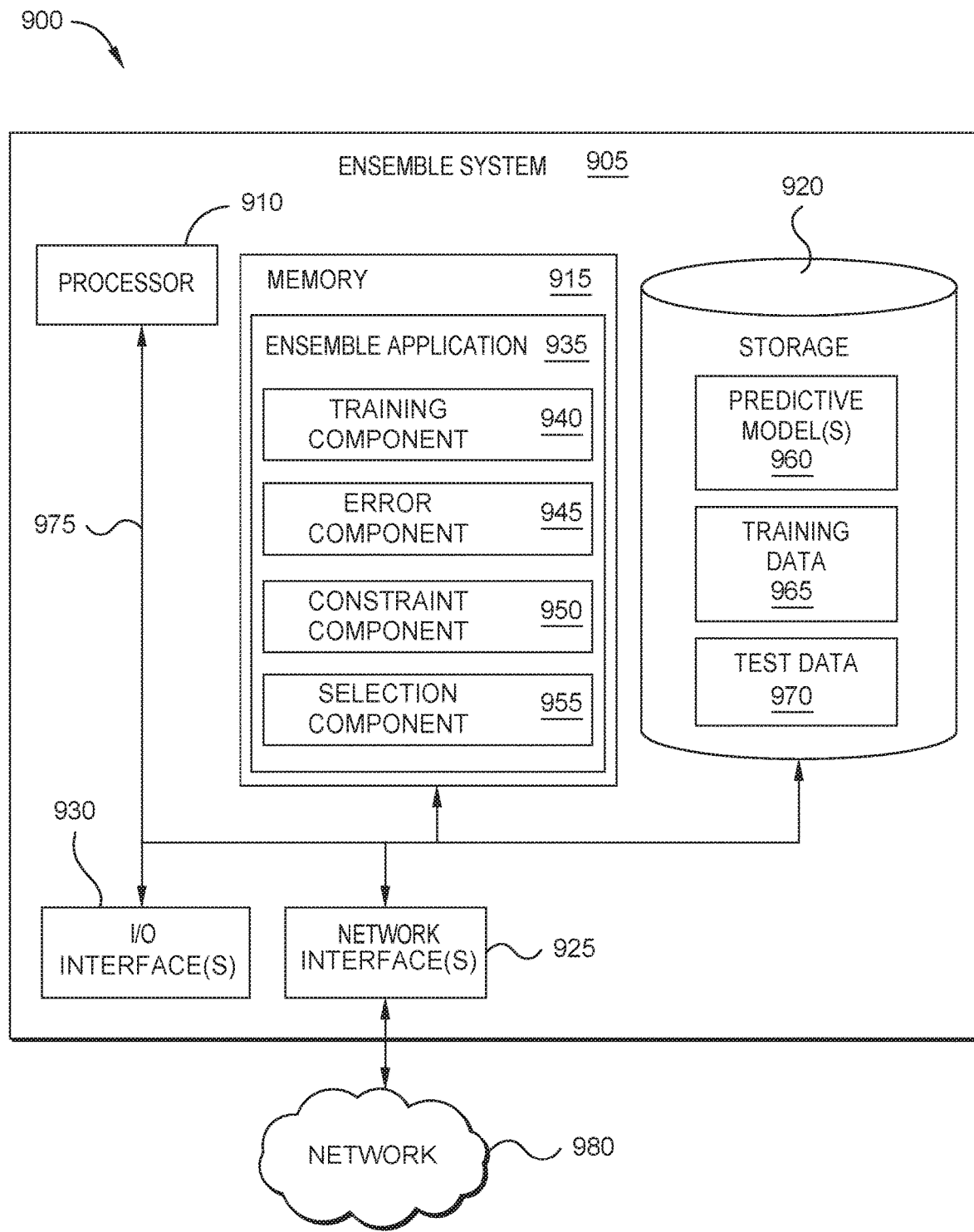
FIG. 9 is a block diagram depicting an ensemble system configured to generate and evaluate model ensembles to improve performance, according to some embodiments disclosed herein.

FIG. 9 is a block diagram depicting an Ensemble System 905 configured to generate and evaluate model ensembles to improve performance, according to some embodiments disclosed herein. Although depicted as a physical device, in embodiments, the Ensemble System 905 may be implemented using virtual device(s), and/or across a number of devices (e.g., in a cloud environment). As illustrated, the Ensemble System 905 includes a Processor 910, Memory 915, Storage 920, a Network Interface 925, and one or more I/O Interfaces 930. In the illustrated embodiment, the Processor 910 retrieves and executes programming instructions stored in Memory 915, as well as stores and retrieves application data residing in Storage 920. The Processor 910 is generally representative of a single CPU and/or GPU, multiple CPUs and/or GPUs, a single CPU and/or GPU having multiple processing cores, and the like. The Memory 915 is generally included to be representative of a random access memory. Storage 920 may be any combination of disk drives, flash-based storage devices, and the like, and may include fixed and/or removable storage devices, such as fixed disk drives, removable memory cards, caches, optical storage, network attached storage (NAS), or storage area networks (SAN).

In some embodiments, input and output devices (such as keyboards, monitors, etc.) are connected via the I/O Interface(s) 930. Further, via the Network Interface 925, the Ensemble System 905 can be communicatively coupled with one or more other devices and components (e.g., via the Network 980, which may include the Internet, local network(s), and the like). As illustrated, the Processor 910, Memory 915, Storage 920, Network Interface(s) 925, and I/O Interface(s) 930 are communicatively coupled by one or more Buses 975.

In the illustrated embodiment, the Storage 920 includes a set of one or more Predictive Models 960, a set of Training Data 965, and a set of Test Data 970. The Predictive Models 960 generally include any number and variety of models configured to generate predictions or estimates regarding the value of one or more variables at one or more future times, based on the current and/or historical values of one or more variables. The predicted variables may be the same as the current variables (e.g., predicting a future value for a variable based on the current/prior value for the variable), or may include differing variables (e.g., predicting a future value for a first variable based on the current/prior value for a second variable). In embodiments, each of the Predictive Models 960 may be predefined or may be generated by the Ensemble System 905 based on Training Data 965.

The Training Data 965 generally includes data collected at one or more intervals during one or more prior (e.g., completed) projects. For example, for each relevant interval, the Training Data 965 may include values for each of one or more variables as they were known or existed at the time of the relevant interval. The Training Data 965 can further include values for one or more variables as of the conclusion of the project (e.g., the final costs, timeline, resources, and the like). Using the Training Data 965, in an embodiment, the Predictive Models 960 can be constructed. Further, in some embodiments, a subset of the Training Data 965 may be set aside (e.g., not used to train the models) in order to evaluate each Predictive Model 960 and generate error metrics.

The Test Data 970 generally corresponds to data collected for ongoing/uncompleted projects. For a given project, the Test Data 970 generally includes data such as values for one or more variables for one or more intervals (e.g., for intervals that have been completed and/or are underway), but lacks data for at least one or more additional intervals (e.g., for future intervals that have not yet been reached and/or completed). Using the Test Data 970, in some embodiments, the Ensemble System 905 can dynamically evaluate and score models/ensembles for a given project (or set of projects) while the project is still ongoing.

In the illustrated embodiment, the Memory 915 includes an Ensemble Application 935. Although depicted as software residing in Memory 915, in embodiments, the functionality of the Ensemble Application 935 may be implemented using software, hardware, or a combination of software and hardware. As illustrated, the Ensemble Application 935 includes a Training Component 940, an Error Component 945, a Constraint Component 950, and a Selection Component 955. Although depicted as discrete components for conceptual clarity, in embodiments, the operations of the Training Component 940, Error Component 945, Constraint Component 950, and Selection Component 955 may be combined or distributed across any number of components.

In an embodiment, the Training Component 940 generally receives Training Data 965 and generates one or more Predictive Models 960. The technique used to train any given Predictive Model 960 may differ, depending on the underlying architecture of the model. Generally, generating a given Predictive Model 960 includes constructing the model to output predicted values for one or more intervals (or final values for after the final interval) based on one or more prior intervals in the Training Data 965.

The Error Component 945 is generally configured to evaluate the accuracy of each Predictive Model 960 at each interval. For example, as discussed above, the Error Component 945 may utilize a subset of Training Data 965 from completed projects in order to determine how accurately each Predictive Model 960 generates predictions. These error-based metrics can then be utilized to help drive model selection when creating optimized overarching ensembles.

In an embodiment, the Constraint Component 950 is configured to determine relevant non-error constraints for the model ensemble. In various embodiments, these constraints may be predefined and/or user-specified. The non-error constraints generally relate to limitations on the ensemble that are not related to the magnitude of the error. For example, the constraints can include limits on the total number of models that can be selected, the total number of model switches for the ensemble, a minimum "up time" of a model (e.g., where a model, once selected, must remain in use for at least a minimum time or number of intervals), sign changes between predictions made in adjacent intervals, and the like. In some embodiments, the Constraint Component 950 can further determine appropriate weights/penalties for each such constraint. For example, model switches or sign changes occurring early in the project may be associated with a relatively lower penalty than switches or changes occurring later in the project.

In the illustrated embodiment, the Selection Component 955 is generally used to select one or more Predictive Models 960 at each interval in order to generate one or more overarching ensembles. In one embodiment, the Selection Component 955 does so using a constraint-optimization problem in order to minimize the penalty of the combination (e.g., determined based on the constraints and weights of each) while maximizing the accuracy (e.g., minimizing the error of the combination). This allows the Selection Component 955 to generate ensembles that may perform more accurately for realistic projects.

In some embodiments, the Selection Component 955 can also utilize Test Data 970 from ongoing projects in order to select one or more ensembles for use with the project. For example, as discussed above, the Selection Component 955 may use Test Data 970 to score each of one or more generated ensembles, in order to identify the ensemble(s) and/or underlying constraints that yielded the most effective predictions. This can allow the Ensemble Application 935 to intelligently and dynamically generate and select among ensembles in order to best-respond to ongoing projects.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the preceding, reference is made to embodiments presented in this disclosure. However, the scope of the present disclosure is not limited to specific described embodiments. Instead, any combination of the features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the aspects, features, embodiments and advantages discussed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a user may access applications (e.g., an Ensemble Application 935) or related data available in the cloud. For example, the Ensemble Application 935 could execute on a computing system in the cloud and generate ensembles of predictive models based on training data. In such a case, the Ensemble Application 935 could generate and score ensembles, and store them at a storage location in the cloud. Doing so allows a user to access this information from any computing system attached to a network connected to the cloud (e.g., the Internet).

While the foregoing is directed to embodiments of the present invention, other and further embodiments of the invention may be devised without departing from the basic scope thereof, and the scope thereof is determined by the claims that follow.

What is claimed is:

1. A method, comprising:
receiving a plurality of models trained to generate predictions for each interval of a plurality of sequential intervals;
generating a plurality of model ensembles, each specifying one or more of the plurality of models for each interval of the plurality of sequential intervals, wherein generating the plurality of model ensembles comprises, for each respective model ensemble of the plurality of model ensembles:
selecting a respective model, from the plurality of models, for each respective interval based on (i) a respective prediction accuracy of the respective model at the respective interval, and (ii) at least one non-error metric for the respective model at the respective interval, wherein the at least one non-error metric specifies constraints for configuring the respective model ensemble from the one or more of the plurality of models;
receiving a test data set, wherein the test data set includes values collected during a first interval and a second interval of the plurality of sequential intervals and does not include values collected during at least a third interval of the plurality of intervals, wherein the third interval is subsequent to the second interval and the second interval is subsequent to the first interval; and
selecting a first model ensemble, of the plurality of model ensembles, based on processing the test data set using each of the plurality of model ensembles, comprising:
determining a first difference between a first prediction of the first model ensemble for the first interval and the values of the test data set for the first interval;
determining a second difference between a second prediction of the first model ensemble for the second interval and the values of the test data set for the second interval; and
generating a weighted score based on the first and second differences, comprising weighting the first difference lower than the second difference based on determining that the second interval is subsequent to the first interval.

2. The method of claim 1, wherein selecting the first model ensemble comprises, for each respective model ensemble of the plurality of model ensembles:
generating a respective score for the respective model ensemble based on a respective prediction accuracy of the respective model ensemble.

3. The method of claim 1, wherein selecting the first model ensemble comprises, for each respective model ensemble of the plurality of model ensembles:
generating a respective score for the respective model ensemble based on a respective variance between predictions generated by the respective model ensemble at adjacent intervals in the plurality of intervals.

4. The method of claim 1, wherein selecting the first model ensemble comprises, for each respective model ensemble of the plurality of model ensembles:
generating a respective score for the respective model ensemble based on a tendency of the respective model ensemble to generate predictions that exceed the test data.

5. The method of claim 1, wherein selecting the first model ensemble comprises, for each respective model ensemble of the plurality of model ensembles:
generating a respective score for the respective model ensemble based on a tendency of the respective model ensemble to generate predictions that are lower than the test data.

6. The method of claim 1, the method further comprising:
receiving a revised test data set, wherein the revised test data set includes values for the second interval and does not include values for at least a third interval of the plurality of intervals; and selecting a second model ensemble, of the plurality of model ensembles, based on processing the revised test data set using each of the plurality of model ensembles.

7. One or more computer-readable storage media collectively containing computer program code that, when executed by operation of one or more computer processors, performs an operation comprising:
receiving a plurality of models trained to generate predictions for each interval of a plurality of sequential intervals;
generating a plurality of model ensembles, each specifying one or more of the plurality of models for each interval of the plurality of sequential intervals, wherein generating the plurality of model ensembles comprises, for each respective model ensemble of the plurality of model ensembles:
selecting a respective model, from the plurality of models, for each respective interval based on (i) a respective prediction accuracy of the respective model at the respective interval, and (ii) at least one non-error metric for the respective model at the respective interval, wherein the at least one non-error metric specifies constraints for configuring the respective model ensemble from the one or more of the plurality of models;
receiving a test data set, wherein the test data set includes values collected during a first interval and a second interval of the plurality of sequential intervals and does not include values collected during at least a third interval of the plurality of intervals, wherein the third interval is subsequent to the second interval and the second interval is subsequent to the first interval; and
selecting a first model ensemble, of the plurality of model ensembles, based on processing the test data set using each of the plurality of model ensembles, comprising:
determining a first difference between a first prediction of the first model ensemble for the first interval and the values of the test data set for the first interval;
determining a second difference between a second prediction of the first model ensemble for the second interval and the values of the test data set for the second interval; and
generating a weighted score based on the first and second differences, comprising weighting the first difference lower than the second difference based on determining that the second interval is subsequent to the first interval.

8. The computer-readable media of claim 7, wherein selecting the first model ensemble comprises, for each respective model ensemble of the plurality of model ensembles:
generating a respective score for the respective model ensemble based on a respective prediction accuracy of the respective model ensemble.

9. The computer-readable media of claim 7, wherein selecting the first model ensemble comprises, for each respective model ensemble of the plurality of model ensembles:
generating a respective score for the respective model ensemble based on a respective variance between predictions generated by the respective model ensemble at adjacent intervals in the plurality of intervals.

10. The computer-readable media of claim 7, wherein selecting the first model ensemble comprises, for each respective model ensemble of the plurality of model ensembles:
generating a respective score for the respective model ensemble based on a tendency of the respective model ensemble to generate predictions that exceed the test data.

11. The computer-readable media of claim 7, wherein selecting the first model ensemble comprises, for each respective model ensemble of the plurality of model ensembles:
generating a respective score for the respective model ensemble based on a tendency of the respective model ensemble to generate predictions that are lower than the test data.

12. The computer-readable media of claim 7, the operation further comprising:
receiving a revised test data set, wherein the revised test data set includes values for the second interval and does not include values for at least a third interval of the plurality of intervals; and
selecting a second model ensemble, of the plurality of model ensembles, based on processing the revised test data set using each of the plurality of model ensembles.

13. A system comprising:
one or more computer processors; and
one or more memories collectively containing one or more programs which when executed by the one or more computer processors performs an operation, the operation comprising:
receiving a plurality of models trained to generate predictions for each interval of a plurality of sequential intervals;
generating a plurality of model ensembles, each specifying one or more of the plurality of models for each interval of the plurality of sequential intervals, wherein generating the plurality of model ensembles comprises, for each respective model ensemble of the plurality of model ensembles:
selecting a respective model, from the plurality of models, for each respective interval based on (i) a respective prediction accuracy of the respective model at the respective interval, and (ii) at least one non-error metric for the respective model at the respective interval, wherein the at least one non-error metric specifies constraints for configuring the respective model ensemble from the one or more of the plurality of models;
receiving a test data set, wherein the test data set includes values collected during a first interval and a second interval of the plurality of sequential intervals and does not include values collected during at least a third interval of the plurality of intervals, wherein the third interval is subsequent to the second interval and the second interval is subsequent to the first interval; and
selecting a first model ensemble, of the plurality of model ensembles, based on processing the test data set using each of the plurality of model ensembles, comprising:
determining a first difference between a first prediction of the first model ensemble for the first interval and the values of the test data set for the first interval;
determining a second difference between a second prediction of the first model ensemble for the second interval and the values of the test data set for the second interval; and
generating a weighted score based on the first and second differences, comprising weighting the first difference lower than the second difference based on determining that the second interval is subsequent to the first interval.

14. The system of claim 13, wherein selecting the first model ensemble comprises, for each respective model ensemble of the plurality of model ensembles:
generating a respective score for the respective model ensemble based on a respective prediction accuracy of the respective model ensemble.

15. The system of claim 13, wherein selecting the first model ensemble comprises, for each respective model ensemble of the plurality of model ensembles:
generating a respective score for the respective model ensemble based on a respective variance between predictions generated by the respective model ensemble at adjacent intervals in the plurality of intervals.

16. The system of claim 13, wherein selecting the first model ensemble comprises, for each respective model ensemble of the plurality of model ensembles:
generating a respective score for the respective model ensemble based on a tendency of the respective model ensemble to generate predictions that exceed the test data.

17. The system of claim 13, wherein selecting the first model ensemble comprises, for each respective model ensemble of the plurality of model ensembles:
generating a respective score for the respective model ensemble based on a tendency of the respective model ensemble to generate predictions that are lower than the test data.

18. The system of claim 13, the operation further comprising:
receiving a revised test data set, wherein the revised test data set includes values for the second interval and does not include values for at least a third interval of the plurality of intervals; and
selecting a second model ensemble, of the plurality of model ensembles, based on processing the revised test data set using each of the plurality of model ensembles.

* * * * *